Figure 1:
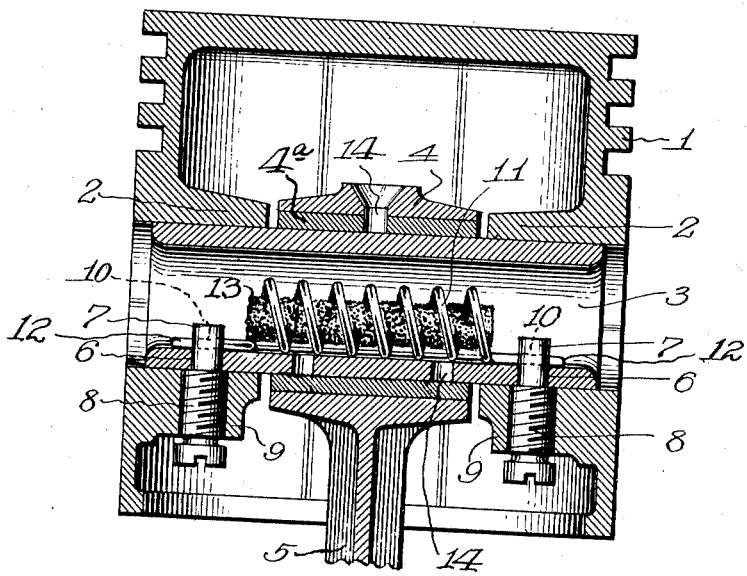

W. H. REDDIG.
DEVICE FOR HOLDING AND LOCKING PISTON PIN SCREWS AND LUBRICATION OF PIN.
APPLICATION FILED SEPT. 15, 1919.

1,366,937.

Patented Feb. 1, 1921.

Inventor
William H. Reddig,

By *[signature]*

Attorneys

UNITED STATES PATENT OFFICE.

WILLIAM H. REDDIG, OF DETROIT, MICHIGAN.

DEVICE FOR HOLDING AND LOCKING PISTON-PIN SCREWS AND LUBRICATION OF PIN.

1,366,937.

Specification of Letters Patent.   Patented Feb. 1, 1921.

Application filed September 15, 1919.   Serial No. 323,907.

*To all whom it may concern:*

Be it known that I, WILLIAM H. REDDIG, a citizen of the United States of America, residing at Detroit, in the county of Wayne and State of Michigan, have invented certain new and useful Improvements in Devices for Holding and Locking Piston-Pin Screws and Lubrication of Pin, of which the following is a specification, reference being had therein to the accompanying drawings.

In connecting a piston to a connecting rod by means of a piston pin it is the present practice to fix the piston pin relative to the piston by means of screws mounted in the piston and extending into the piston pin, so as to prevent rotary and longitudinal movement of the piston pin in the piston. The screws for this purpose are liable to become loose and release the piston pin, and to prevent this I have devised a simple and inexpensive device which may be easily and quickly installed in the piston to positively lock the screws against accidental rotation. The device is constructed so that should occasion require the screws may be released and removed, otherwise it is practically impossible for the screws to become detached.

The device by which I attain the above results serves as a holder for a lubricant absorptive material adapted to hold a lubricant in suspension and thus insure a small and constant supply at the bearings of the piston pin.

My device will be hereinafter more fully considered and then claimed, and reference will now be had to the drawing, wherein—

Figure 2:
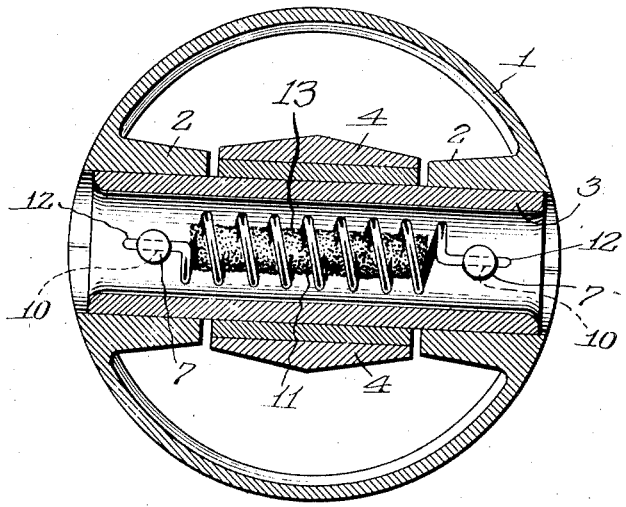

Figure 1 is a vertical sectional view of a piston in accordance with my invention; and Fig. 2 is a horizontal sectional view of the same.

In the drawings, the reference numeral 1 denotes a piston provided with inwardly projecting diametrically opposed bosses 2 for a tubular piston pin 3 which supports the bushing 4ª and head 4 of a connecting rod 5 between the bosses 2, said connecting rod and its head also being of a conventional form.

The piston pin 3 continuous to the ends thereof is provided with openings 6 for the reduced inner ends 7 of screws 8 mounted in the bosses 2 or enlargements 9 thereon. The screws 8 are positioned so as to be adjusted from the open end of the piston 1, and the inner reduced ends of said screws are devoid of threads and are provided with transverse apertures 10.

In the tubular piston pin 3 is placed a coiled expansion spring 11, having its convolutions terminating in locking pins 12 which longitudinally aline and extend through the apertures 10 of the inner ends 7 of the screws 8, so as to hold the screws against accidental rotation.

With the piston removed from a cylinder it is possible to compress or shift one end of the spring 11 so that the locking end thereof will be retracted from the aperture 10 of one of the screws and with the spring out of engagement with the screw it is possible to remove the screw and then withdraw the spring so that the other screw may also be removed. After one screw has been installed the device can be easily placed in engagement with the screw and then the other screw installed and the device further manipulated to hold both screws. In some instances it may be desirable to bend the outer ends of the locking pins 12 so as to insure a more positive engagement with the inner ends of the screws 8, but the device will serve its purpose just as well as illustrated.

With the screws 8 constituting means for holding the piston pin within the piston bosses, and the spring constituting means within the piston pin 3 for locking said holding means, it is practically impossible for the piston pin or its screws to become accidentally displaced.

The spring 11 may inclose a holder 13 for a lubricant supplied by a splash system or any other means; the head 4, bushing 4ª, and pin 3 being ported, as at 14, to permit the lubricant to circulate. The holder 13 may be made of felt or any absorptive material.

One embodiment of my invention has been illustrated, but it is to be understood that the structural elements are susceptible to such variations and modifications as fall within the scope of the appended claims.

What I claim is:—

1. The combination with a piston, a connecting rod, and a pin connecting said rod to said piston, of means holding said pin relative to said piston, means locking said holding means, and a lubricant holder inclosed by said locking means.

2. The combination of a piston having bosses, a connecting rod, a pin in said piston bosses supporting said connecting rod, screws in said piston bosses and extending into said pin, and a long coiled spring having its end convolutions straightened to afford locking pins extending through said screws and maintaining said spring against the wall of said pin.

3. Locking means for screws comprising a spring having its end convolutions extending into said screws, and a lubricant holder carried by said spring.

4. The combination of a tubular pin having ports, screws preventing rotation of said pin, connecting means in said pin for said screws, and lubricant holding means carried by said connecting means at the ports of said pin.

In testimony whereof I affix my signature in the presence of two witnesses.

WILLIAM H. REDDIG.

Witnesses:
L. C. CURL,
CLARENCE A. NEATE.